United States Patent
Desai et al.

(10) Patent No.: US 12,356,465 B2
(45) Date of Patent: Jul. 8, 2025

(54) MANAGING SATELLITE NETWORK DEMAND FOR EMERGENCY SERVICES

(71) Applicant: Skylo Technologies, Inc., Palo Alto, CA (US)

(72) Inventors: Soham Dhiren Desai, Palo Alto, CA (US); Andrew Nuttall, Mountain View, CA (US); Meghna Agrawal, Cupertino, CA (US); Sreedar Sambangi, Newark, CA (US); Vijay Lewis, Wylie, TX (US); Sriram Subramanian, North Brunswick, NJ (US); Anteneh Adem, Espoo (FI)

(73) Assignee: Skylo Technologies, Inc., Mountain View, CA (US)

(*) Notice: Subject to any disclaimer, the term of this patent is extended or adjusted under 35 U.S.C. 154(b) by 373 days.

(21) Appl. No.: 18/126,514

(22) Filed: Mar. 27, 2023

(65) Prior Publication Data
US 2024/0334490 A1    Oct. 3, 2024

(51) Int. Cl.
*H04W 74/0833* (2024.01)
*H04B 7/185* (2006.01)
*H04W 4/06* (2009.01)
*H04W 4/90* (2018.01)
*H04W 28/26* (2009.01)

(52) U.S. Cl.
CPC .... *H04W 74/0833* (2013.01); *H04B 7/18513* (2013.01); *H04W 4/90* (2018.02); *H04W 28/26* (2013.01)

(58) Field of Classification Search
CPC ............... H04W 74/0833; H04W 4/90; H04W 28/26; H04W 4/06; H04B 7/18513
See application file for complete search history.

(56) References Cited

U.S. PATENT DOCUMENTS

| | | |
|---|---|---|
| 8,653,963 B2 | 2/2014 | Vallaire |
| 2008/0141300 A1 | 6/2008 | Yun et al. |
| 2009/0224966 A1 | 9/2009 | Boling et al. |
| 2011/0207428 A1* | 8/2011 | Ueda ............... H04W 12/126 455/404.1 |
| 2011/0222520 A1 | 9/2011 | Montemurro |
| 2013/0281045 A1 | 10/2013 | Daly et al. |
| 2014/0273911 A1 | 9/2014 | Dunn et al. |
| 2016/0295385 A1* | 10/2016 | Wang ............... H04W 4/90 |
| 2022/0217790 A1* | 7/2022 | Qiu ............... H04W 74/0833 |
| 2024/0163744 A1* | 5/2024 | Agiwal ............ H04W 36/0072 |

* cited by examiner

Primary Examiner — Harry H Kim
(74) Attorney, Agent, or Firm — Brian R. Short

(57) ABSTRACT

Apparatuses, methods, and systems for managing a network demand for emergency services are disclosed. One method includes adaptively reserving, by a base station of a satellite network, reserved PRACH (physical random access channel) preambles for a plurality of reserved services, broadcasting, by the base station, the configuration, wherein a wireless device receives the reserved PRACH preambles configuration, wherein the wireless device selects a reserved service from the plurality of reserved services and transmits a PRACH preamble from the reserved preambles, and transmitting, by the base station, a message grant to the wireless device in response to the PRACH preamble, wherein the wireless device transmits to the base station a response that includes the selected reserved service from the plurality of reserved services in response to the message grant from the base station.

30 Claims, 10 Drawing Sheets

Exemplary Response (Message 3) from Wireless Device to Base Station (According to TLV (type-length-value) Format)

| RRC (Radio Resource Control) Connection Requirement 810 | IMEI (International Mobile Equipment Identity)/IMSI (International Mobile Subscriber Identity) 820 | GNSS (Global Navigation Satellite Systems) 830 | Data 840 |
|---|---|---|---|

Figure 8

MANAGING SATELLITE NETWORK DEMAND FOR EMERGENCY SERVICES

FIELD OF THE DESCRIBED EMBODIMENTS

The described embodiments relate generally to wireless communications. More particularly, the described embodiments relate to systems, methods, and apparatuses for managing satellite network demand for emergency services.

BACKGROUND

Satellite networks operate to cover large areas and can have a large number of users. Further, only limited amounts of spectral resources are allocated to satellite networks. Accordingly, satellite networks should be selective in allowing user access to the satellite networks for emergency services.

It is desirable to have methods, apparatuses, and systems managing satellite network demand for emergency services.

SUMMARY

An embodiment includes a method for managing satellite network demand for emergency services. The method includes adaptively reserving, by a base station of a satellite network, reserved PRACH (physical random access channel) preambles configuration for a plurality of reserved services, broadcasting, by the base station, the reserved PRACH preambles configuration, wherein a wireless device receives the reserved PRACH preambles configuration, wherein the wireless device selects a reserved service from the plurality of reserved services and transmits a PRACH preamble from the reserved preambles, and transmitting, by the base station, a message grant to the wireless device in response to the PRACH preamble, wherein the wireless device transmits to the base station a response that includes the selected reserved service from the plurality of reserved services in response to the message grant from the base station.

Another embodiment includes a satellite wireless network that provides management of a network demand for emergency services. The network includes a base station configured to adaptively reserve PRACH (physical random access channel) preambles configuration for a plurality of reserved services, broadcast the reserved PRACH preambles configuration, and a wireless device configured to receive the reserved PRACH preambles configuration, selects a reserved service from the plurality of reserved services, and transmits a PRACH preamble from the reserved preambles. The base station is further configured to transmit a message grant to the wireless device in response to the PRACH preamble, and the wireless device is further configured to transmit to the base station a response that includes the selected reserved service from the plurality of reserved services in response to the message grant from the base station.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 shows a response from a wireless device to a base station, according to an embodiment.

DETAILED DESCRIPTION

The embodiments described include methods, apparatuses, and systems for managing a managing satellite network demand for emergency services.

Figure 1:
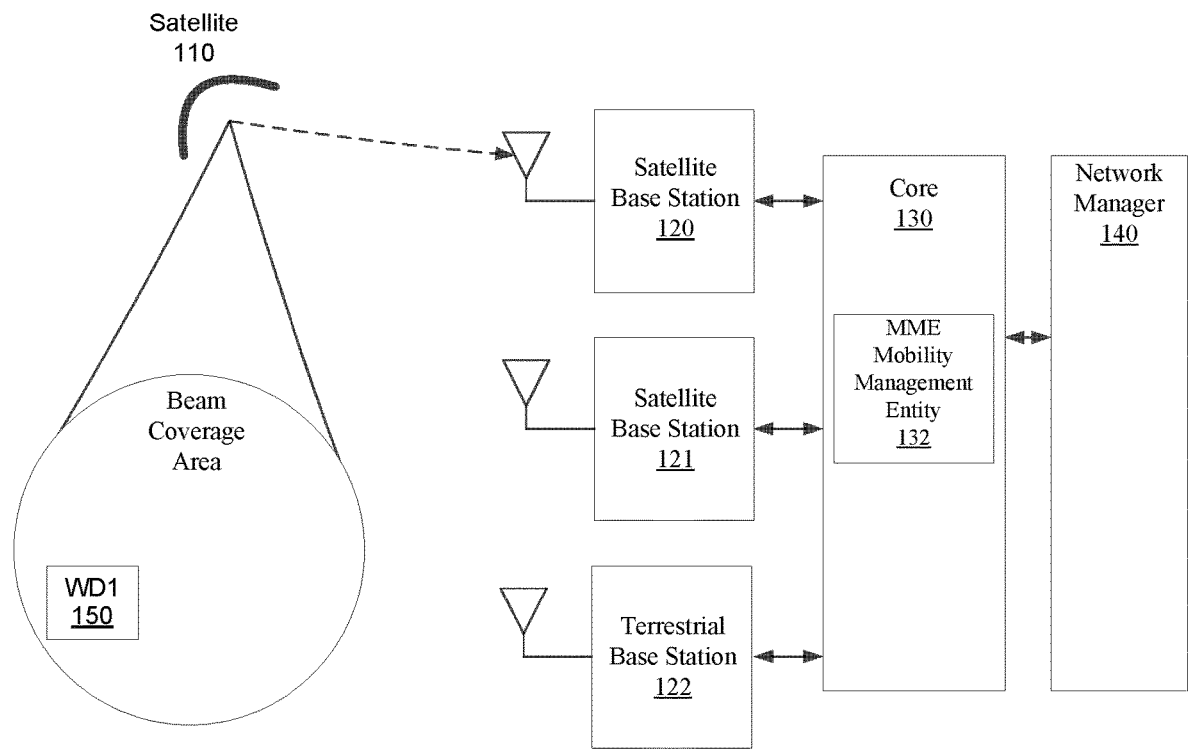
FIG. 1 shows a satellite network that includes a base station wirelessly communicating with a wireless device, according to an embodiment.

FIG. 1 shows a satellite network that includes a base station 120 wirelessly communicating with a wireless device 150, according to an embodiment. As shown, a wireless link is formed between the base station 120 and the wireless device 150 through a satellite 110. The satellite 110 forms a beam that allows the base station 120 to wirelessly communicate with wireless devices located within a beam coverage area of the beam.

As shown, for an embodiment, the satellite network further includes base stations 121, 122 which provide wireless coverage to different or overlapping areas as the beam coverage of the base station 120. For an embodiment, the base stations 120, 121, 122 are electronically connected to a core 130 that includes a MME (mobility management entity) 132. Further, the core 130 is electronically connected to a network manager 140 and an upstream network (not shown).

For an embodiment, the base station 120 is configured to adaptively reserve PRACH (physical random access channel) preambles for a plurality of reserved services. For an embodiment, a preamble includes a specific frequency hopping pattern (known sequence of frequency hops) which is known to both the wireless device and base station. For an embodiment, an initial first message of the wireless device is transmitted by the wireless device to the base station according to a reserved preamble which can be received and decoded by the base station. For an embodiment, J preambles are available for wireless communication between the base station and the wireless device. For an embodiment, N of the J are designated for reserved services, such as emergency services.

For an embodiment, in addition to adapting the number of reserved preambles allocated for reserved services, the wireless network can also adapt the periodicity of slots (such as, time slots) of the reserved preambles.

Figure 2:
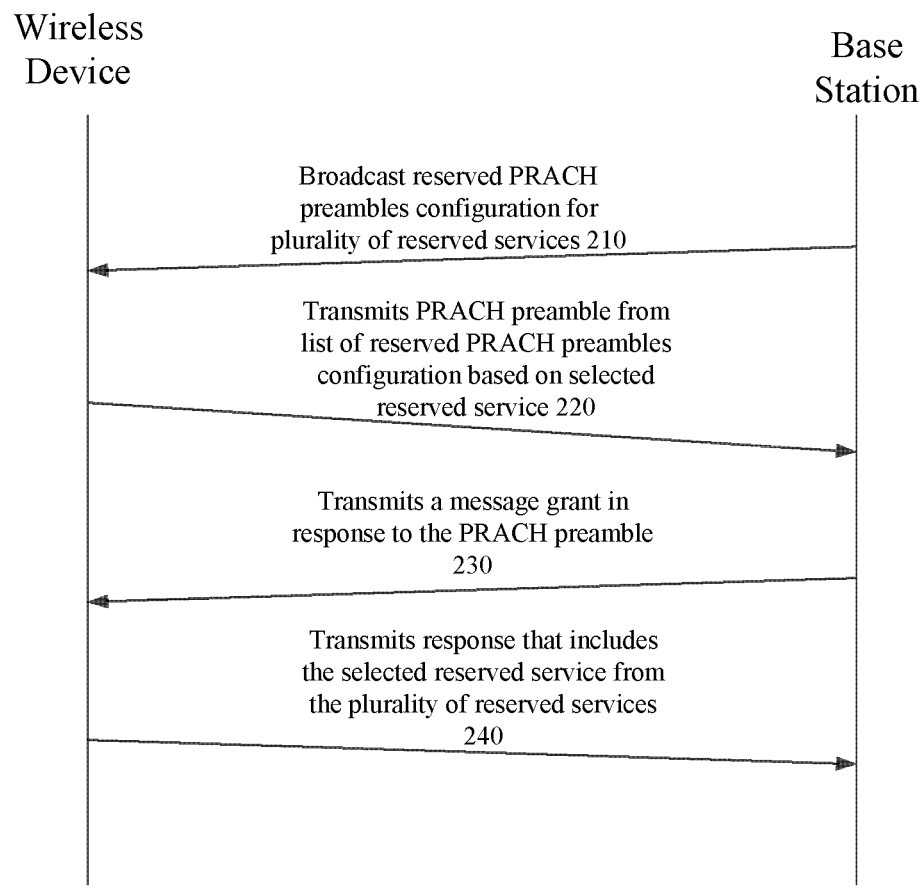
FIG. 2 shows a flow diagram of a satellite wireless network that provides management of a network demand for emergency services, according to an embodiment.

FIG. 2 shows a flow diagram of a satellite wireless network that provides management of a network demand for emergency services, according to an embodiment. For an embodiment, a first action 210 includes broadcasting, by the base station, the reserved PRACH preambles configuration. For an embodiment, the broadcast is a System Information Block message(s). For an embodiment, the wireless device receives the reserved PRACH preambles configuration via the broadcast. Once received, for an embodiment, the wireless device selects a reserved service from the plurality of reserved services. For an embodiment, a second action 220 includes the wireless device transmits a PRACH preamble from the reserved preambles based on the selected reserved service (reserved service selected by the wireless device). After the base station receives the PRACH preamble from the wireless device, a third action 230 includes the base station operating to transmit a message grant to the wireless device in response to the PRACH preamble. After receiving the message grant from the base station, for an embodiment, a fourth action 240 includes the wireless device transmitting to the base station a response that includes the selected reserved service from the plurality of reserved services in response to the message grant from the base station.

For at least some embodiments, it is to be understood that the base station is actually not broadcasting the actual PRACH preambles but rather broadcasting an indication of which of one or more PRACH preambles are reserved. For an embodiment, broadcasting the indication of which of one or more PRACH preambles are reserved is facilitated by the base station broadcasting the reserved PRACH preambles configuration. For an embodiment, the indication of which of one or more PRACH preambles are reserved or the reserved PRACH preambles configuration can be either in the form a range of indices, a configuration, or a dictionary which maps reserved services to the reserved PRACH preambles configuration.

The actions or steps of FIG. 2 reduce the amount of wireless channel resources as these actions allow the wireless device to transmit mission critical data (such as, a location of the wireless device, an identification of the wireless device) for reserved services with less overhead. For an embodiment, mission critical data may be transmitted as part of an early data transmission in a 3GPP defined message 3 in response to the message 2. The message 3 is also referred to as a random-access response message. Further for an embodiment a radio resource connection may be terminated following the early data transmission. Further, the actions of FIG. 2 allow the base station to provide priority for certain types of reserved services. For an embodiment, a wireless device signals a required priority level of the wireless device through either the selection of the PRACH preamble or a communicated service type. For an embodiment, the base station prioritizes scheduling of constrained uplink, downlink, and multicast data channels based upon the selection of the PRACH preamble or communicated service type. For an embodiment, after receiving a reserved PRACH preamble for a high QOS, the base station prioritizes a grant for High QoS. For an embodiment, the base station preemptively provides an uplink grant for the high QoS services. For an embodiment prioritization of the grant includes transmitting sooner or not responding to certain low priority services.

Figure 3:
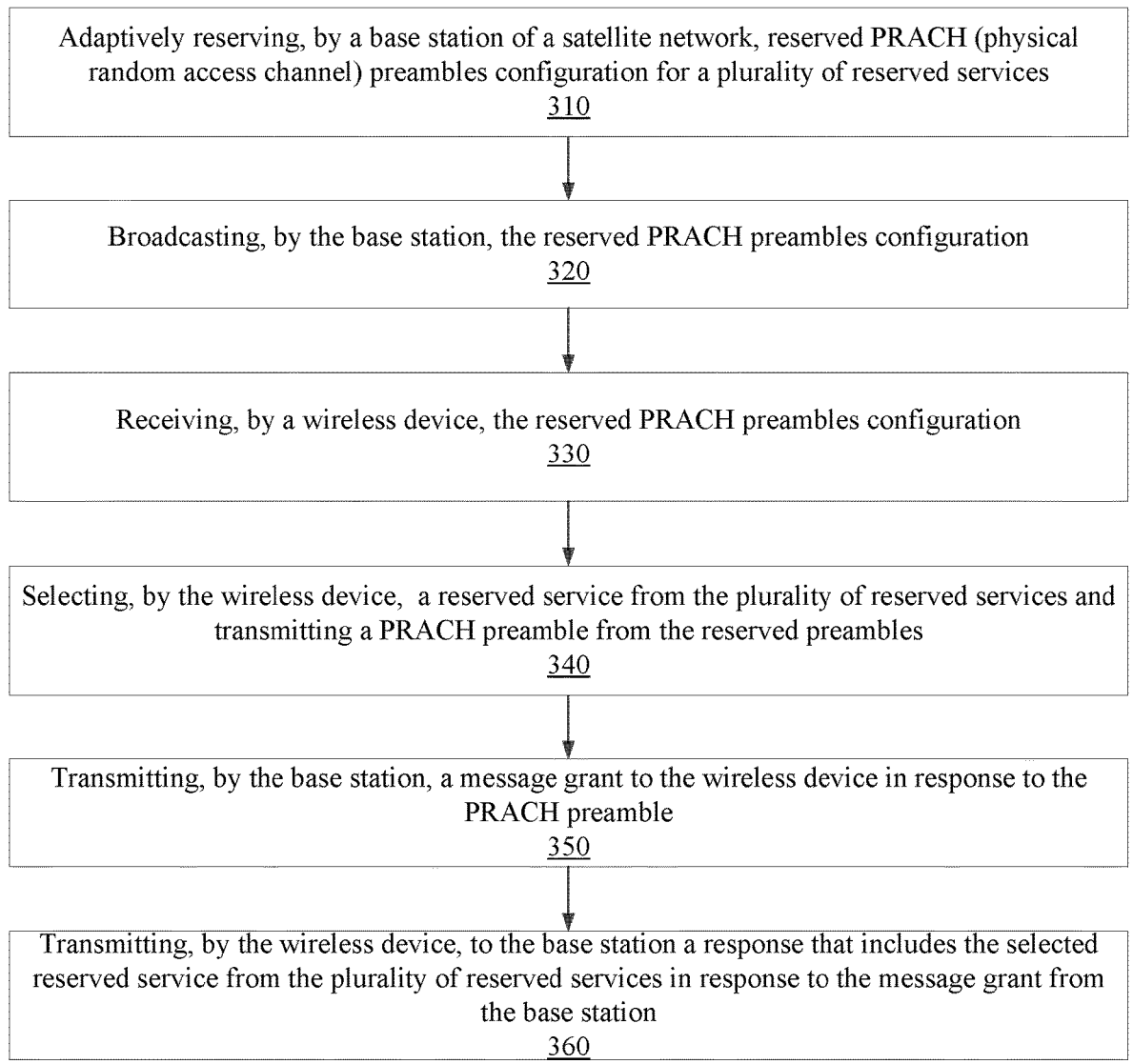
FIG. 3 is a flow chart that includes steps of a method of a satellite wireless network that provides management of a network demand for emergency services, according to an embodiment.

FIG. 3 is a flow chart that includes steps of a method of a satellite wireless network that provides management of a network demand for emergency services, according to an embodiment. A first step 310 includes adaptively reserving, by a base station of a satellite network, reserved PRACH (physical random access channel) preambles configuration for a plurality of reserved services. A second step 320 includes broadcasting, by the base station, (through, for example, System Information Block messages) the reserved PRACH preambles configuration. A third step 330 includes receiving, by a wireless device, the reserved PRACH preambles configuration. A fourth step 340 includes selecting, by the wireless device, a reserved service from the plurality of reserved services and transmitting a PRACH preamble from the reserved preambles. A fifth step 350 includes transmitting, by the base station, a message grant to the wireless device in response to the PRACH preamble. A sixth step 360 includes transmitting, by the wireless device, to the base station a response that includes the selected reserved service from the plurality of reserved services in response to the message grant from the base station.

As previously described, for at least some embodiments, it is to be understood that the base station is actually not broadcasting the actual PRACH preambles but rather broadcasting an indication of which of one or more PRACH preambles are reserved. For an embodiment, broadcasting the indication of which of one or more PRACH preambles are reserved is facilitated by the base station broadcasting the reserved PRACH preambles configuration. For an embodiment, the indication of which of one or more PRACH preambles are reserved or the reserved PRACH preambles configuration can be either in the form a range of indices, a configuration, or a dictionary which maps reserved services to the reserved PRACH preambles configuration.

For a least some embodiments, other portions of the wireless network either aid the base station or alternatively perform the adaptive reserving of the reserved PRACH (physical random access channel) preambles configuration for a plurality of reserved services. For example, an upstream server or a core network of the wireless network may aid or perform the adaptive reserving of the reserved PRACH (physical random access channel) preambles configuration for a plurality of reserved services.

For an embodiment, the PRACH preamble (reserved PRACH preamble) can be apriory known to the wireless device. For an embodiment, the wireless device can store information related to the reserved PRACH preamble in non-volatile memory as per a network requirement.

At least some embodiments further include broadcasting, by the base station, the plurality of reserved services, wherein the wireless device receives the plurality of reserved services broadcast by the base station. That is, for an embodiment, the base station broadcasts both the reserved PRACH preambles configuration and the plurality of reserved services.

For an embodiment, the base station supports the transmission of early data without a full network connection. For an embodiment, the base station performs a full network connection with a wireless device based upon either the selected reserved preamble or based upon the selected reserve service. For an embodiment, when full network connection is required, base station establishes full RRC connection with the wireless device. For an embodiment, the base station will determine a priority (QOS) of the DL (downlink data traveling from the base station to the wireless device) data transmission and future uplink (from the wireless device to the base station) transmissions based upon either the selected reserved preamble or based upon the selected reserve service or both. For an embodiment, the DL data transmission includes both DL data transmission as well as paging transmission. For an embodiment, the base station will determine priority (QOS) of the DL data transmission and future uplink transmissions based upon the establishment cause. For an embodiment, DL data transmission prioritization can be decided on indication provided by base stations to the data or network servers.

For an embodiment, a timing and content of the message grant transmitted by the base station is based on the PRACH preamble as selected from the reserved PRACH preambles configuration. At least some embodiments further include broadcasting, by the base station, a multicast packet after receiving the PRACH preamble from the wireless device, wherein the wireless device receives the multicast packet after the transmission of the PRACH preamble. For an embodiment, the wireless device interprets the received multicast packet based upon the selected reserved PRACH preamble (that is, the PRACH preamble) previously transmitted by the wireless device.

For an embodiment the multicast packet contains timing advance, identification (Random access Identifier), and scheduling information. For an embodiment the multicast packet contains acknowledgment data. For an embodiment, the multicast packet contains application-level data. For an embodiment, the multicast packet includes RRC connection setup parameters for the device.

For an embodiment, each of the PRACH preamble of the reserved PRACH preambles configuration are designated by a PRACH window that designates a timing slot of transmission of the PRACH preamble. For an embodiment, at a fixed time after a PRACH window a corresponding multicast packet is sent (transmitted by the base station). For an embodiment, the multicast packet corresponds with a specific previous PRACH window and the wireless devices (including the wireless device) that utilized that PRACH window by selecting the corresponding selected reserved PRACH preamble (that is, the PRACH preamble) of the reserved PRACH preambles configuration. For example, 10 different wireless devices may transmit reserved preambles (a PRACH preamble) during a specific PRACH window. These 10 wireless devices will then listen (receive a broadcast from the base station) to the multicast packet corresponding to that PRACH window. For an embodiment each of the wireless devices know what content of the multicast packet is destined for the wireless device based upon which reserved preamble the wireless devices transmitted as the PRACH preamble.

For the described embodiments, multicast messages are broadcast by the base station to multiple wireless devices at the same time. Upon receiving the multicast message, each wireless device reads or processes the complete message and interprets which part of the message specifically intended for the wireless device. For an embodiment, each wireless device is able to determine which part of the multicast message is intended for the wireless device based on which PRACH preamble the wireless device selected from the reserved PRACH preambles configuration to previously transmit to the base station. For an embodiment the wireless device receives an array of values in the multicast packet and selects the value from the array according to an index (wherein the index indicates which number PRACH of available PRACHs was used) of the corresponding reserved PRACH preamble selected. For an embodiment the wireless devices receiving the multicast messages selects the value from the array according to the identifier used in the multicast message. For an embodiment, the reserved selected services are indicated by the wireless device by using an establishment cause sent when establishing a connection to the base station.

For an embodiment, the selected reserved service from the plurality of reserved services includes an indication of a specific packet format used to communicate data. For example, the selected service can indicate that the 'A proprietary Messaging Format' is used for data encapsulation.

For an embodiment, the selected reserved PRACH preamble (that is, the reserved preamble) indicates the quality of service or priority of the message to be sent.

For an embodiment, the selected reserved service from the plurality of reserved services includes an indication of a destination module for user data. For example, a service type can indicate SOS data with an emergency response service as a destination module. For an embodiment, the destination module (which may be an end point which is, for example, a fixed network server) the service to which data is routed by a base station or core of the wireless network. For an embodiment, the destination module includes a network server, a cloud application, an emergency response server, or a microservice.

For an embodiment, the selected reserved service from the plurality of reserved services includes an indication of an associated quality of service being required.

For an embodiment, the selected reserved service from the plurality of reserved services includes an indication of a pre-defined bearer ID for communication data, wherein the pre-defined bearer ID is used for connecting the wireless device to a packet data network (PDN) through a PDN gateway. That is, for an embodiment, bearers are the tunnels used to connect the user equipment (such as, the wireless device) to Packet Data Networks (PDNs) such as the Internet. For an embodiment, the bearers are concatenated tunnels that connect the user equipment (such as, the wireless device) to the PDN through the Packet Data Network Gateway (P-GW) and is associated with its unique bearer ID. If a wireless device wants to communicate with a different PDN, a new P-GW needs to be created which will have a new Bearer ID.

At least some embodiments further include creating a multicast group of a plurality of wireless devices including the wireless device based on each of the plurality of wireless devices selecting the PRACH preamble from the reserved PRACH preambles configuration. For an embodiment, multiple wireless devices are added to one multicast group while establishing a RRC (Radio Resource Control) connection to a base station based upon the selected reserved PRACH preamble. At least some embodiments further include aggregating message grants to each of the plurality of wireless devices based on each of the plurality of wireless devices selecting the PRACH preamble, and broadcasting, by the base station, the aggregated message grants as a multicast group based on each of the plurality of wireless devices selecting the PRACH preamble.

At least some embodiments further include aggregating acknowledgment messages for the plurality of wireless devices of the multicast group, and broadcasting, by the base station, the aggregated acknowledgement messages of the plurality of wireless devices of the multicast group. For an embodiment, for every message transmitted by a wireless device, there is an acknowledgment sent by the base station. The acknowledgement can be a positive acknowledgment if a message is received or a negative acknowledgment if the message is expected but not received. Furthermore, an acknowledgment can be sent by a server (for example, an emergency response server) for a wireless device indicating the reception of a message and which includes downlink data as a response to the message sent by the wireless device. For an embodiment, multicast packet can also include the temporary identifiers for the devices with positive acknowledgement (wireless devices with positive acknowledgement refers to the devices from which a message or packet is received successfully).

At least some embodiments further include dynamically adjusting a periodicity of the broadcasting of the aggregated message grants as a multicast group based on a number of wireless devices selecting the PRACH preamble. That is, the periodicity the aggregated message grants is changed based on how many wireless devices selected the corresponding PRACH preamble. For an embodiment, if the number of wireless devices using the preserver PRACH preambles increases, the periodicity of broadcast of the aggregated message grants decreases.

For the embodiments described here, multicast refers to a method of delivering data to multiple devices simultaneously using a single transmission. In contrast to unicast, where data is sent to a single device, and broadcast, where data is sent to all devices in the network, multicast allows for the efficient distribution of data to a specific group of devices. For the embodiments described, a multicast group address can be used to identify the group of devices that will receive the data. For an embodiment, the multicast group address is a unique identifier that allows wireless devices to join or leave the multicast group as needed. When a wireless device wants to receive multicast data, the wireless device sends a request to join the multicast group using a specific control message. Once the wireless device is registered with the multicast group, the wireless device can receive the data transmitted by the network.

For at least some embodiments, wireless devices can send a PRACH preamble from the reserved PRACH preambles configuration. For an embodiment, the base station can use this selection to add the wireless device to a specific multicast group. For an embodiment, the base station can also add a wireless device to a multicast group (MCG) by using the establishment cause used by the wireless device while establishing connection with the base station. For an embodiment, different establishment causes can have different multicast groups. For example, establishment cause 'mt-data' can be added to 1 MCG while 'mo-data' can be added to 2nd a MCG.

For an embodiment, based on the PRACH preamble selected by the wireless device, the base station derives a temporary identifier for the wireless device. This temporary identifier can be used by the base station for further communication to the wireless device. For multicast, for an embodiment, the base station scrambles the data with this temporary identifier and sends the data to all the wireless devices. Since, the temporary identifier is used along with the data transmission in multicast, only the wireless device who selected and transmitted a particular preamble can decode the data even though all other devices received the same information. Hence, using scrambled preamble multicast operation is made possible.

At least some embodiments further include controlling access to emergency services of the plurality of reserved services based on at least one of an access point name (APN) of the wireless device, or a requested service type. That is, access to emergency services are allowed or disallowed based upon APN and/or service type. At least some embodiments further include controlling access to emergency services for the APN based on at least one of a network load or external data sources.

For at least some embodiment, the establishment cause is used to differentiate between normal service data requirements and wireless device application data with high priority service requirements at the core level. For an embodiment, establishment causes can be used to set up specific APNs (access point names). For example, if the base station sends moExceptionData parameter as an establishment cause. The wireless device sets moExceptionData in the establishment cause field of the RRCConnectionRequest message when the RRC is established for sending exception report message(s). For an embodiment, establishment causes can be used by the base station to determine if a full RRC connection is required or not. Based on the establishment cause the base station can decide whether to maintain RRC connection or move to RRC Idle state.

For an embodiment, the base station could also use a moExceptionData parameter to differentiate and prioritize wireless devices requests with high-priority services requirements. To differentiate between wireless devices which have access to high-priority services and which have not, different APNs could be used. Wireless devices with high-priority services access could have their default APN set to the APN that can grant them high-priority services. For an embodiment, the core network could be configured to differentiate wireless devices with access to high-priority services based on their APN. If the APN of the PDN (packet data network) connection on which the wireless devices application data is received is for normal services, the core base station has included the moExceptionData indicator. If the APN of the PDN connection on which the wireless devices application data is received is for high-priority services, then if the eNB includes moExceptionData indicator, then the wireless devices data should be handled as a data with high-priority service requirements. Otherwise, the wireless devices data should be handled as a data with normal service requirements.

For an embodiment, a timing and content of the message grant transmitted by the base station is based on the selected PRACH preamble from the plurality of reserved PRACH preambles. For an embodiment, based on a QoS (quality of service) request of the PRACH preamble, processing of the grant (which is a later described Message 2) can be adjusted. For example, for an embodiment, a high QoS request will result in a quicker (faster) response of the grant (quicker for higher QoS Requests). For an embodiment, the content of the grant can also solicit additional information from the wireless device (location, wireless device ID (such as, IMEI, etc.) based on selected PRACH preamble. For an embodiment, the base station may not provide a grant for some lower QoS requests in a heavily loaded environment. That is, for an embodiment, the base station does not provide a grant for request for a QoS less than a QoS threshold when the base station is operating with a level of data traffic greater than a data traffic threshold.

For an embodiment, the base station further broadcasts an associated mapping between the reserved preambles and the reserved services. For an embodiment, the associated mapping is broadest with the initial broadcast (of step 320). For an embodiment, the associated mapping is broadest after the initial broadcast (of step 320). For an embodiment, the base station operates to generate the mapping. For an embodiment, the mapping is provided to the base station from, for example, a third party. For an embodiment, the mapping is dynamically (changes over time) generated based on one or more of network traffic, reserved service utilization, outside events like emergencies (for example, an earthquake etc.). For an embodiment, the plurality of services includes at least different categories of quality of services.

For an embodiment, the wireless device includes in its response to the message grant from the base station additional information based on the selected reserved service or selected reserved PRACH preamble. For an embodiment, the additional information includes a GNSS (Global navigation satellite system) location of the device based on the selected reserved service.

For an embodiment, the wireless device includes in its response to the message grant from the base station additional information that includes a unique identifier of the device based on the selected reserved service. For at least some embodiments, the unique identifier includes an IMEI (International Mobile Equipment Identity) or an IMSI (International Mobile Subscriber Identity).

Figure 4:
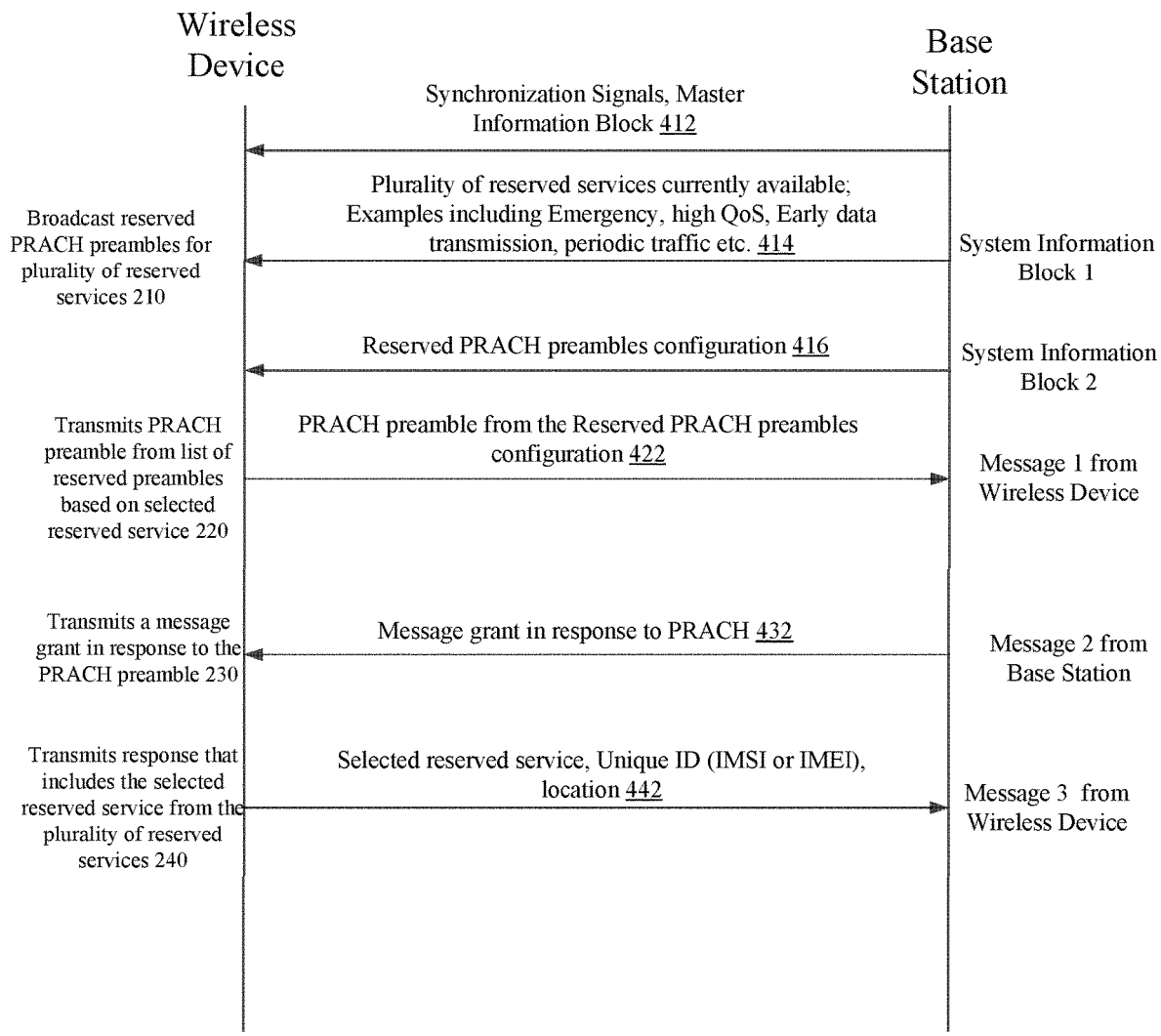
FIG. 4 shows a more detailed flow diagram of a satellite wireless network that provides management of a network demand for emergency services, according to an embodiment.
Figure 5:
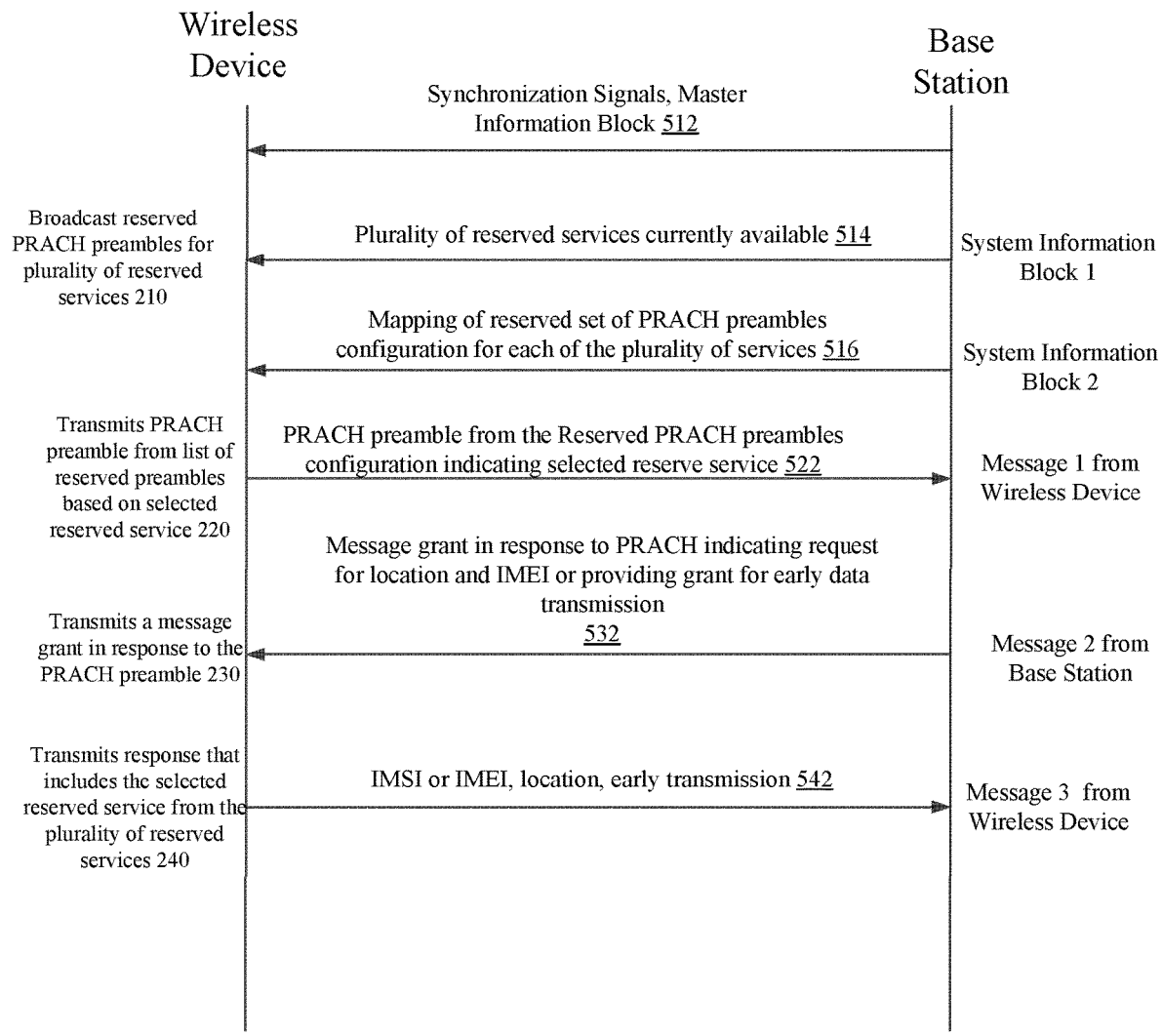
FIG. 5 shows a more detailed flow diagram of a satellite wireless network that provides management of a network demand for emergency services, according to another embodiment.

For an embodiment, the wireless device includes in its response to the message grant from the base station additional information that includes a service Id for the selected reserved service. For an embodiment, the response includes a message 3 and is in the form of an TLV (length-time-value) format as shown in FIG. 8. As shown in FIGS. 4 and 5, The PRACH preamble transmitted by wireless device may be referred to as message 1. The random access response and message grant transmitted by base station may be referred to as message 2. The response transmitted by wireless device after receiving a message grant may be referred to as message 3.

At least some embodiments further include dynamically changing, by the base station, a number of reserved PRACH preambles based on network traffic conditions. For example, of N=reserved preambles, M=all other preambles, the J=N+M=Total Preambles. For an embodiment, the number N of reserved preambles is adapted based on a utilization of the number N of reserved preambles. For example, if the utilization of N is greater than a selected threshold (such as, 90%) then N is incremented (N+1), and the incremented (adjusted value of N) is broadcast by the base station through, for example, a System Information Block (SIB) message. For example, if the utilization of N is less than a selected threshold (such as, 10%) then N is decremented (N−1), and the decremented (adjusted value of N) is broadcast by the base station through, for example, a System Information Block (SIB) message. For an embodiment, the utilization (as, for example, a percentage of utilization) is determined over a selected time threshold, such as, over 100 seconds.

For an embodiment, the base station adapts the reserved PRACH preambles configuration and reserved services after a selected period of time, wherein the selected period of time is referred to as a monitoring window. For an embodiment, the monitoring window is a time after which base station adapts the services and reserved PRACH preamble configuration. For an embodiment, the monitoring window can be adapted based on an SIB broadcast periodicity, a PRACH preamble periodicity, a number of services supported, a wireless network load or the duration of time for which the wireless network load (data traffic load) is greater than a threshold. For an embodiment, the wireless network load can be measured in terms of uplink channel utilization, downlink channel utilization, and/or a number of PRACH preambles received by the base station. For an embodiment, a moving average window principle is used to calculate the selected time threshold or monitoring window.

For an embodiment, a maximum load of the wireless network is selected to be a preselected percentage (such as, 90%) of total capacity. This percentage is selected to account for error margins, and to allow emergency services to be provided by the base station. As previously described, for an embodiment, the monitoring window can be adapted based on an SIB broadcast periodicity, a PRACH preamble periodicity, a number of services supported, a wireless network load or the duration of time for which the wireless network load (data traffic load) is greater than a threshold. If the capacity utilization or load of the wireless network is very low, less monitoring is needed for dynamic service and preamble allocation since there is less chance of wireless devices suddenly surging. For an embodiment, the base station can reduce the number or services offered if the wireless network load is higher than the 90% (preselected percentage threshold) for a threshold duration of time. If a number of P of services are offered by default, the number of services is only set to less than the default number P if the wireless network capacity reaches more than 90% in at least one in the last X monitored windows.

At least some embodiments further include dynamically changing, by the base station, the associated mapping of reserved PRACH preambles to reserved services based on network traffic conditions. For an embodiment, if a number of wireless devices (including, for example, the wireless device) are using emergency services, this is an indication that there might be an outage in a terrestrial network in the area and the base station should use additional preambles for emergency service. For an embodiment, if greater than a threshold number or greater than a threshold percentage of wireless devices are using the emergency service, then additional (more) preambles are allocated to the emergency service. For an embodiment, in addition to adapting the number of reserved preambles allocated for reserved services, the wireless network can also adapt the periodicity of slots (such as, time slots) of the reserved preambles.

At least some embodiments further include dynamically changing, by the base station, a number of reserved PRACH preambles based on external data sources. For at least some embodiments, the external data sources include one or more of external weather reports, or news outlets for outages which disrupt the regular terrestrial network services in a region. For an embodiment, when an emergency condition is encountered, all the PRACH preambles to the reserved PRACH preambles are set to support only the reserved services which are offered by the base station. For an embodiment, the base station or an external controller operate to monitor external weather reports, or news outlets for outages which disrupt the regular terrestrial network services in a region. For an embodiment, using this information, the base station uses all preserved preambles for emergency services in the affected tracking areas.

At least some embodiments further include selecting, by the wireless device, the PRACH preamble or a reserved service based on the type and quantity of application data to be sent. For an embodiment, an application on the wireless device operates to provide a data transmission request to wireless device along with the reserved service Id, which is used by the wireless device to select preamble. For an embodiment, an application on the wireless device operates to provide a data transmission request to the wireless device along with a reserved service Id which is used by the wireless device to select the PRACH preamble, wherein a maximum size of application data depends on a type of service.

At least some embodiments further include dynamically changing the broadcast plurality of services provided by the base station based on the network traffic and the QoS of the different reserved services. For at least some embodiments, periodic updates and data collected during the previously described monitoring window are used to calculate the usage of each of the services offered on the wireless network. For example, for an embodiment, if any of the services are using more than 50%(or another service percentage threshold) of the network load where the total network load is equal to or more than 90%(or another network load percentage threshold) and one service has not been used since the last services update, then the unused services is no longer offered until the next update time ends. For an embodiment, if an unsupported service is requested, and if the network load is less than 90% then the wireless device is offered the default services which are usually at a lower QoS.

At least some embodiments further include dynamically changing the broadcast plurality of services provided by the base station based on external data sources. For an embodiment, this provides an indication to a wireless device about terrestrial network outage. For an embodiment, the base station knows about this by external sources and services requested by a majority of the wireless devices. For example, in case of a network outage, the base station can disable all the reserved services except SOS. For an embodiment, the base station broadcasts a message that indicates that the wireless devices are allowed to send SOS data only. For an embodiment, the wireless device can further indicate to a mobile application of the wireless device about the available reserved services.

For an embodiment, dynamically changing the broadcast plurality of services provided by the base station includes changing the plurality of services to be single service which is most critical based on external data sources. For example, a vendor, such as a wireless service provider may request a dedicated bandwidth for certain types of services for their users (wireless devices). For an embodiment, an external source can include the government reserving a certain channel bandwidth for emergency services. An external source can be a weather reporting service.

At least some embodiments further include selecting, by the base station, whether to authenticate the wireless device for access to the satellite network based on the selected PRACH preamble or selected reserved service and provided unique identifiers. As previously described, the unique identifiers may include IMSI or IMEI. For an embodiment, the base station further selects whether to allow IMSI or IMEI for emergency services. For an embodiment, the satellite wireless network maintains a database of unique IDs (IMSI/IMEI) for wireless devices for which emergency services are allowed. For an embodiment, the base station can query the database for the received unique identifier and determine whether requested service is allowed to the device. Alternatively, the database can also be maintained by a core network of the wireless network, and the base station can query the core network before responding to the device.

At least some embodiments further include maintaining, by a network server, a database of unique identifiers for wireless devices that are allowed for emergency services and for pre-authentication of the wireless devices. For an embodiment, a list of IMSIs and IMEIs are already pre-registered with the wireless network and a database is maintained to allow for data transmission with less delay and early grant allocation.

For embodiment, the wireless device has pre-provisioned authentication information which is used for pre-authentication of the wireless device. This information can be stored in the device's persistent memory. For an embodiment, any pre-provisioned device with a satellite service provider is subjected to the use of emergency services from a service provider without any external authentication typically provided by SIM Card. For an embodiment, the SIM-less wireless device is a wireless device that has either a SIM Card without any active satellite service subscription or without any physical SIM Card which typically manages the service registration and methods of subscription. For an embodiment, this lets the wireless device connect to satellite services without any need of the SIM card. For an embodiment, the wireless device can also store a unique ID of the satellite service provider in the memory of the wireless device. For an embodiment, the satellite base station broadcasts a unique ID of the satellite service provider. For an embodiment, this unique ID can be a PLMN (Public Land Mobile Network) Id of the satellite service or the name of the satellite service provider. For an embodiment, this service can be disabled and enabled by the satellite provider using signaling to the device. For an embodiment, the satellite network can send an attach rejection message to the device with a code indicating that the device is not allowed to connect to the network. For an embodiment, the wireless network maintains a database for wireless devices that use IMEI number instead of IMSI number for authentication. Such wireless devices can be referred to as "SIM-less" wireless devices. In addition, the wireless network can also maintain a list of wireless devices and type of services for which authentication is exempted. Such wireless devices can send data transmission without authentication.

For an embodiment, the message grant sent by the base station to the wireless device contains additional application data based on the selected reserved PRACH preamble. For an embodiment, the base station includes a maximum transport block size and the list of additional fields required in the message 3. For an embodiment, the base station requests a location and IMEI information from the wireless device.

At least some embodiments further include smoothing, by the base station, traffic from the wireless device to the base station based on network traffic conditions. For an embodiment, smoothing traffic from the wireless device to the base station includes changing a periodicity of the physical random access channel (PRACH). For an embodiment, the base station can further define the reserved preamble configuration to smooth the network traffic. For example, for an embodiment, the base station can define an SOS preamble configuration and low QoS configuration such that the SOS preamble configuration doesn't overlap with the low QoS preamble configuration. This allows the SOS preamble configuration to have get dedicated frequency spectrum and bandwidth while the network traffic is manipulated to smooth the network traffic over time. For a specific embodiment, the SOS preamble configuration can have a periodicity of 80 msec, whereas low QoS services can have periodicity of 160 msec. For an embodiment, the base station can also use a different subframe offset for different reserved PRACH preambles configuration so that reserved services don't overlap in time. For an embodiment, when the network load (data traffic greater than a threshold) is high for a service, the base station can use higher periodicity for low QoS reserved services which smoothen the data traffic over time.

At least some embodiments include changing back-off timers of the wireless device. For an embodiment, based on network load, a service type and possibility of congestion, the base station and the core network send an attach reject or service reject message and provide a back-off time for when the next time the wireless device can request to transmit data with the base station. For an embodiment, the back-off timer indicates the time interval the wireless device needs to wait after getting a reject message from the base station in order to attempt to send data packets to the same base station. For an embodiment, a backoff timer value depends on the network conditions and overall load (data traffic) of the base station. For an embodiment, if the load is very high (above a threshold), the base station can give a very high value (greater than a preselected period of time) of a back-off timer time to the wireless device.

At least some embodiments include throttling traffic requests from individual wireless devices or endpoints. For an embodiment, based on requested service from the wireless device, the base station already knows about a requested maximum size of the data transmitted by the wireless device per packet, and a QoS requested. For an embodiment, based on the requested maximum size of the data, and a QoS requested, and a wireless network load, base station s dynamically throttles traffic requests and offers a lower QoS to the wireless devices if needed.

At least some embodiments include early rejection of transmission requests based on the selected reserved preamble or selected reserved service. For an embodiment, after receiving the unique ID of the wireless device and a service request type in msg 3, the base station checks whether the wireless device is allowed to transmit the requested service type. For an embodiment, if the wireless device is not allowed, then the base station responds with a service rejection message. For an embodiment, upon receiving the service rejection message, the device does not re-transmit the reserved PRACH preamble. This may indicate that the device is not pre-provisioned by the user or manufacturer for the requested service.

For an embodiment, the base station responds with a backoff request which can include a backoff timer. For an embodiment, upon receiving the back off request from the base station, the wireless device refrains from transmitting another reserved preamble for the given backoff time. For an embodiment, the wireless device can also use exponential backoff after receiving a backoff request from the base station.

FIG. 4 shows a more detailed flow diagram of a satellite wireless network that provides management of a network demand for emergency services, according to an embodiment. FIG. 4 shows additional details of an embodiment of the flow diagram of FIG. 2. For an embodiment, the first action 210 further includes the base station broadcasting a synchronization signal, master information block 412, a plurality of reserved services currently available 414 as within a System Information Block (SIB) 1, and the reserved PRACH preambles configuration 416 within a System Information Block (SIB) 2.

The wireless device responds with the PRACH preamble from the Reserved PRACH preambles configuration 422 as a Message 1. The base station then responds with the message grant in response to eh PRACH preamble 432 as a Message 2. As previously mentioned, the message 2 is also referred to as a random-access response message. The wireless device then responds with the selected reserved services and a unique ID (IMSI or IMEI) 442 as a Message 3.

FIG. 5 shows a more detailed flow diagram of a satellite wireless network that provides management of a network demand for emergency services, according to another embodiment. FIG. 5 shows additional details of an embodiment of the flow diagram of FIG. 2. For an embodiment, the first action 210 further includes the base station broadcasting a synchronization signal, master information block 512, a plurality of reserved services currently available 514 as within a System Information Block (SIB) 1, and a mapping of a reserved set of PRACH preambles for each of the plurality of services 516 within a System Information Block (SIB) 2.

The wireless device responds with the PRACH preamble from the Reserved PRACH preambles configuration 522 indicating the selected reserve service as a Message 1. The base station then responds with the message grant in response to eh PRACH preamble 532 indicating a request for location and IMEI or providing a grant for early data transmission as a Message 2. The wireless device then responds with the selected reserved services and a unique ID (IMSI or IMEI) 542 as a Message 3.

Figure 6:
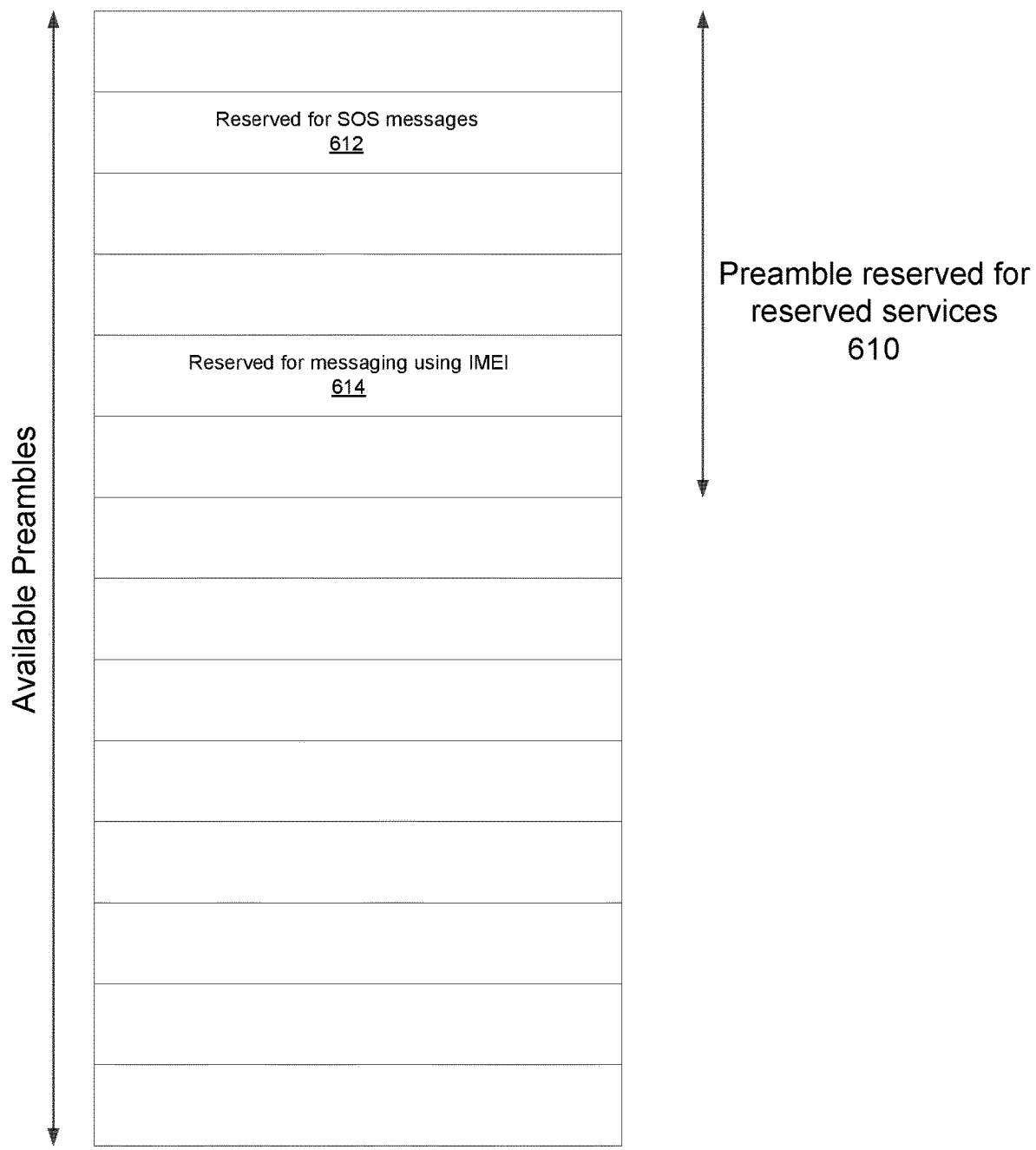
FIG. 6 shows a mapping of a reserved set of preambles, according to an embodiment.

FIG. 6 shows a mapping of a reserved set of preambles, according to an embodiment. As previously described, for an embodiment, the base station is configured to adaptively reserve PRACH (physical random access channel) preambles for a plurality of reserved services. For an embodiment, the preamble includes a specific frequency hopping pattern (known sequence of frequency hops) which is known to both the wireless device and base station. For an embodiment, an initial first message is transmitted by the wireless device according to a reserved preamble, which can be received and decoded by the base station. For an embodiment, J preambles are available for wireless communication between the base station and the wireless device. For an embodiment, N of the J are designated for reserved services, such as emergency services.

FIG. 6 shows an example of the J available preambles in which J of the available preambles 610 are reserved for reserved services. For an embodiment, at least one preamble 612 is reserved for SOS messages, and at least one preamble 614 is reserved for messaging using the unique identifier IMEI.

Figure 7:
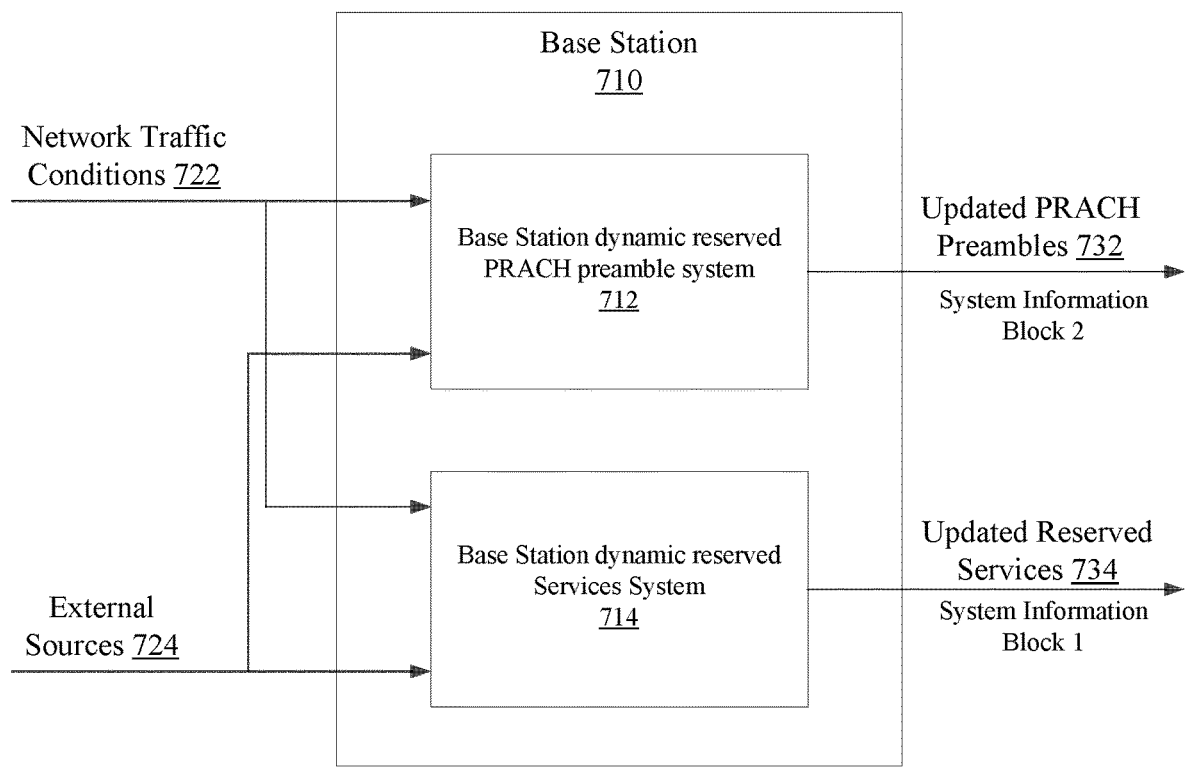
FIG. 7 shows a base station, and processes of the base station including dynamic reservation of PRACH preambles and services, according to an embodiment.

FIG. 7 shows a base station 710, and processes of the base station 710 including dynamic reservation of PRACH preambles and services, according to an embodiment. For an embodiment, the base station 710 includes a dynamic reserved PRACH preamble system 712 for dynamically reserving PRACH preambles. For an embodiment, the base station 710 includes a dynamic reserved service system 714 for dynamically reserving services.

For an embodiment, the base station 710 is configured to dynamically reserve PRACH preambles based on at least one or more of network traffic conditions 722 or inputs from external sources 724. For an embodiment, the base station 710 is configured to dynamically reserve services based on at least one or more of the network traffic conditions 722 or the inputs from external sources 724.

For an embodiment, the base station 710 communicates the updated PRACH preambles 732 as dynamically reserved through a SIB (System Information Block) 2. For an embodiment, the base station 710 communicates the updated reserved services 734 as dynamically reserved through a SIB (System Information Block) 2.

FIG. 8 shows a response from a wireless device to a base station, according to an embodiment. The response shown in FIG. 8 corresponds with the message 3 responses 442, 542 of FIGS. 4 and 5. As shown, for an embodiment, the response includes an RRC (radio resource control) connection requirement 810, an IMEI (International Mobile Equipment Identify) or an IMSI (International Mobile Subscriber Identity) 820, a GNSS (Global Navigation Satellite System) 830 location, and Data 840.

Figure 9A:
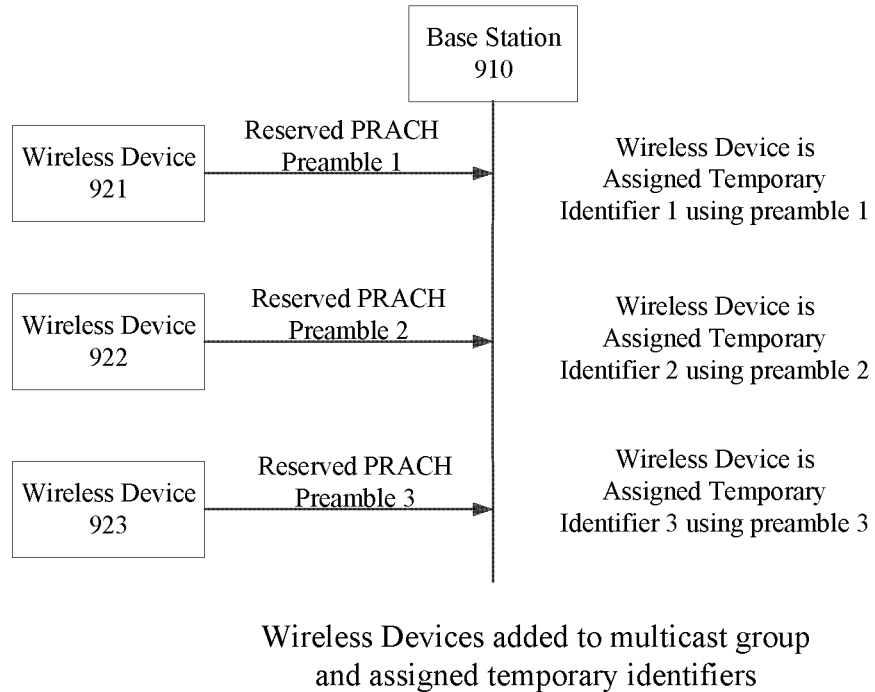
FIGS. 9A and 9B show a base station and a plurality of wireless devices, wherein the wireless devices are assigned to a multicast group and assigned temporary identifiers, according to an embodiment.
Figure 9B:
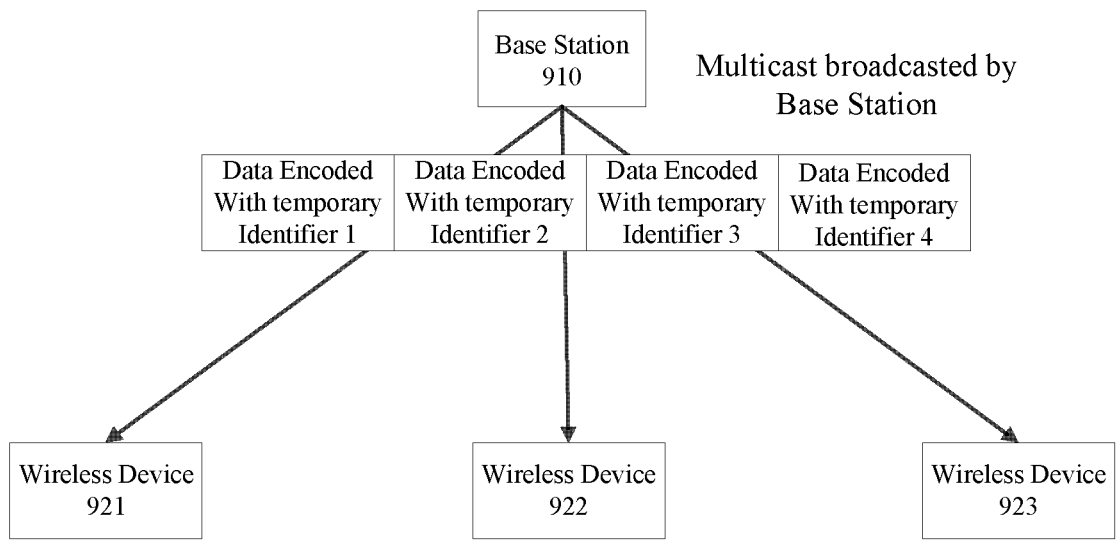

FIGS. 9A and 9B show a base station 910 and a plurality of wireless devices 921, 922, 923, wherein the wireless devices 921, 922, 923 are assigned to a multicast group and assigned temporary identifiers, according to an embodiment. As shown, for an embodiment, the wireless device 921 selects a PRACH preamble 1 from the reserved PRACH preambles configuration, the wireless device 922 selects a PRACH preamble 2 from the reserved PRACH preambles configuration, and the wireless device 923 selects a PRACH preamble 3 from the reserved PRACH preambles configuration. Based on the PRACH preamble selection of each of the wireless devices 921, 922, 923, the base station 910 assigns a temporary identifier to each of the wireless devices 921, 922, 923. For example, due to the wireless device 921 selecting the PRACH preamble 1 of the reserved PRACH preambles configuration, the base station 910 assigns the temporary identifier 1 to the wireless device 921. Due to the wireless device 922 selecting the PRACH preamble 2 of the reserved PRACH preambles configuration, the base station 910 assigns the temporary identifier 2 to the wireless device 922. Due to the wireless device 923 selecting the PRACH preamble 3 of the reserved PRACH preambles configuration, the base station 910 assigns the temporary identifier 3 to the wireless device 923. That is, as shown in FIG. 9A, each of the wireless devices 921, 922, 923 are added to a corresponding multicast group and assigned temporary identifiers.

Further, as shown in FIG. 9B, the base station 910 broadcasts the multicast communication in which data is encoded with each of corresponding identifiers 1, 2, 3, 4. Accordingly, the wireless device that transmitted the correspondingly selected PRACH preamble of the reserved PRACH preambles configuration is able to decode the encoded data.

Figure 10A:
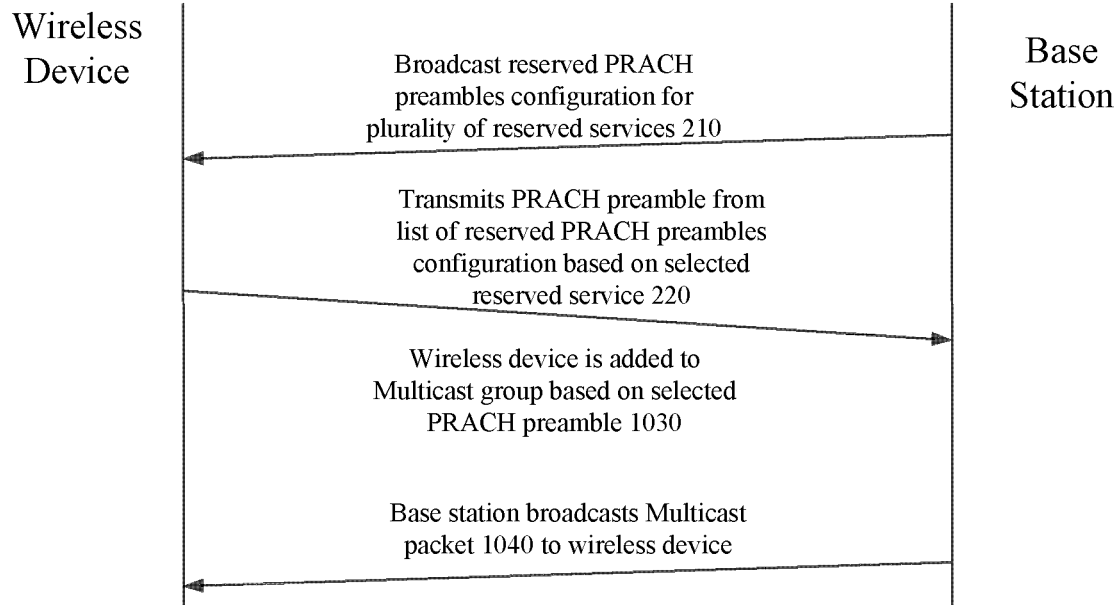
FIGS. 10A and 10B show flow diagrams of a satellite wireless network that provides management of a network demand for emergency services that further includes a multicast packet and a multicast group of a plurality of wireless devices, according to an embodiment.
Figure 10B:
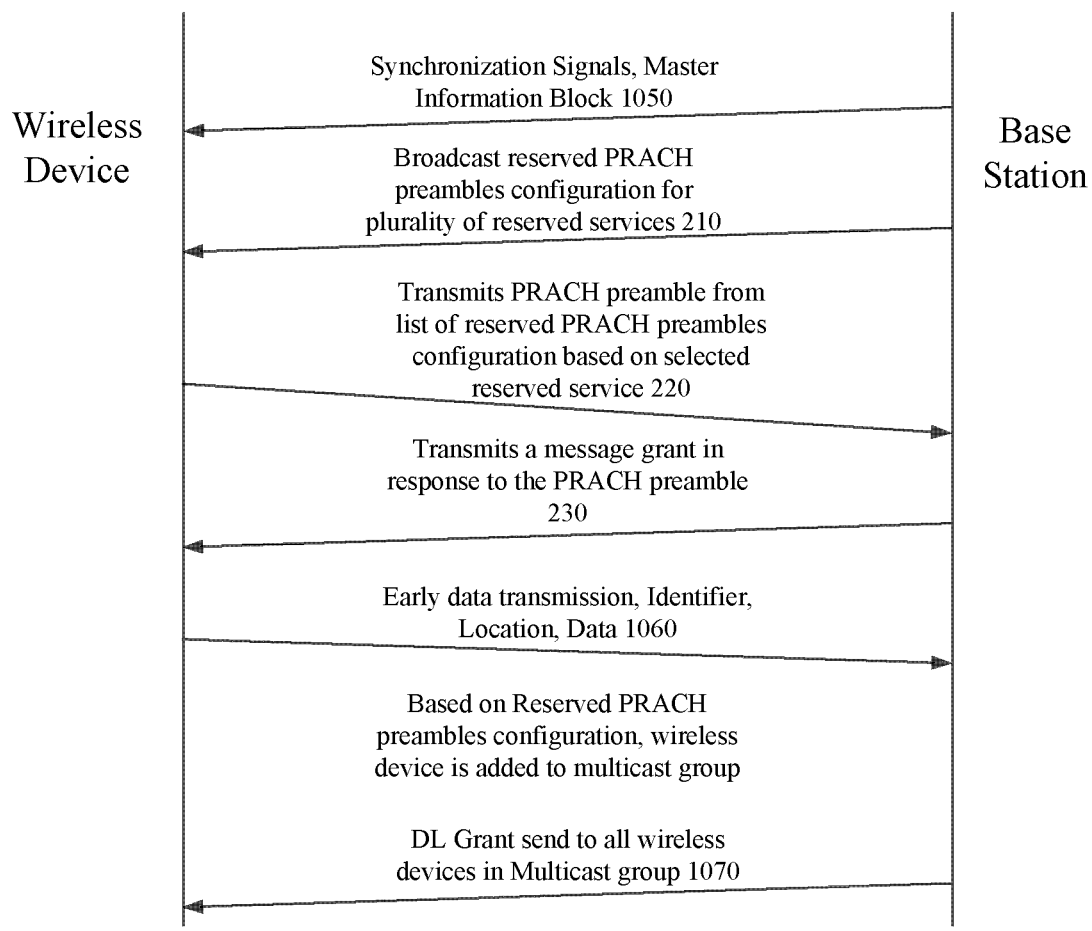

FIGS. 10A and 10B show flow diagrams of a satellite wireless network that provides management of a network demand for emergency services that further includes a multicast packet and a multicast group of a plurality of wireless devices, according to an embodiment. FIG. 10A shows the first action 210 that includes broadcasting, by the base station, the reserved PRACH preambles configuration. For an embodiment, the broadcast is a System Information Block message(s). For an embodiment, the wireless device receives the reserved PRACH preambles configuration via the broadcast. Once received, for an embodiment, the wireless device selects a reserved service from the plurality of reserved services. For an embodiment, the second action 220 includes the wireless device transmits a PRACH preamble from the reserved preambles based on the selected reserved service (reserved service selected by the wireless device).

For an embodiment, an action 1030 includes the wireless device then being added to a multicast group based on the PRACH preamble selected from the reserved PRACH preambles configuration. An action 1040 then includes the base station broadcasting a multicast packet to the wireless device.

FIG. 10B includes an act 1050 of the base station initially transmitting synchronization signals and a master information block to the wireless devices. FIG. 10B then shows subsequent acts 210, 220, 230 as previously described. An act 1060 includes the wireless device that transmitting early data transmission, an identifier, location information, and data. Again, based on the PRACH preamble of reserved PRACH preambles configuration selected and transmitted by the wireless device, the wireless device is added to a multicast group.

An act 1070 includes the base station broadcasting (multicasting) a downlink (DL) grant to all wireless devices within the multicast group.

Although specific embodiments have been described and illustrated, the embodiments are not to be limited to the specific forms or arrangements of parts so described and illustrated. The described embodiments are to only be limited by the claims.

What is claimed:

1. A method for managing a network demand for emergency services, comprising:
adaptively reserving, by a base station of a satellite network, reserved PRACH (physical random access channel) preambles configuration for a plurality of reserved services;
broadcasting, by the base station, the reserved PRACH preambles configuration;
wherein a wireless device receives the reserved PRACH preambles configuration; and
wherein the wireless device selects a reserved service from the plurality of reserved services and transmits a PRACH preamble from the reserved PRACH preambles configuration;
transmitting, by the base station, a message grant to the wireless device in response to the PRACH preamble;
controlling access to emergency services of the plurality of reserved services based on at least one of an access point name (APN) of the wireless device, or a requested service type;
wherein the wireless device transmits to the base station a response that includes the selected reserved service from the plurality of reserved services in response to the message grant from the base station.

2. The method of claim 1, further comprising:
broadcasting, by the base station, the plurality of reserved services;
wherein the wireless device receives the plurality of reserved services broadcast by the base station.

3. The method of claim 1, further comprising controlling access to emergency services for the APN based on at least one of a network load or external data sources.

4. The method of claim 1, wherein a timing and content of the message grant transmitted by the base station is based on the PRACH preamble as selected from the reserved PRACH preambles configuration.

5. The method of claim 4, further comprising:
broadcasting, by the base station, at least one multicast packet after receiving the PRACH preamble from the wireless device;
wherein the wireless device receives the at least one multicast packet after the transmission of the PRACH preamble.

6. The method of claim 5, wherein the wireless device interprets the received at least one multicast packet based upon the selected reserved PRACH preamble previously transmitted by the wireless device.

7. The method of claim 1, wherein the selected reserved service from the plurality of reserved services includes an indication of a specific packet format used to communicate data.

8. The method of claim 1, wherein the selected reserved service from the plurality of reserved services includes an indication of a destination module for user data.

9. The method of claim 1, wherein the selected reserved service from the plurality of reserved services includes an indication of an associated quality of service.

10. The method of claim 1, wherein the selected reserved service from the plurality of reserved services includes an indication of a pre-defined bearer ID for communication data, wherein the pre-defined bearer ID is used for connecting the wireless device to a packet data network (PDN) through a PDN gateway.

11. The method of claim 1, further comprising:
creating a multicast group of a plurality of wireless devices including the wireless device based on each of the plurality of wireless devices selecting the PRACH preamble from the reserved PRACH preambles configuration.

12. The method of claim 11, further comprising:
aggregating message grants to each of the plurality of wireless devices based on each of the plurality of wireless devices selecting the PRACH preamble;
broadcasting, by the base station, the aggregated message grants as a multicast group based on each of the plurality of wireless devices selecting the PRACH preamble.

13. The method of claim 12, further comprising:
aggregating acknowledgment messages for the plurality of wireless devices of the multicast group;
broadcasting, by the base station, the aggregated acknowledgement messages of the plurality of wireless devices of the multicast group.

14. The method of claim 12, further comprising:
dynamically adjusting a periodicity of the broadcasting of the aggregated message grants as a multicast group based a number of wireless devices selecting the PRACH preamble.

15. The method of claim 1, wherein the base station further broadcasts an associated mapping between the reserved PRACH preambles and the reserved services.

16. The method of claim 15, further comprising:
dynamically changing, by the base station, the associated mapping of reserved PRACH preambles to reserved services based on network traffic conditions.

17. The method of claim 1, wherein the wireless device includes in its response to the message grant from the base station additional information based on the selected reserved service or selected reserved PRACH preamble.

18. The method of claim 17, wherein the additional information includes a GNSS location of the device based on the selected reserved service.

19. The method of claim 1, further comprising:
dynamically changing, by the base station, a number of reserved PRACH preambles based on external data sources.

20. The method of claim 1, further comprising:
selecting, by the wireless device, the PRACH preamble or a reserved service based on the type and quantity of application data to be sent.

21. The method of claim 1, wherein-an application on the wireless device operates to provide a data transmission request to the wireless device along with a reserved service Id which is used by the wireless device to select the PRACH preamble, wherein a maximum size of application data depends on a type of service.

22. The method of claim 1, further comprising:
dynamically changing the broadcast plurality of services provided by the base station based on the network traffic and the QoS of the different reserved services.

23. The method of claim 1, further comprising:
dynamically changing the broadcast plurality of services provided by the base station based on external data sources.

24. The method of claim 1, further comprising:
selecting, by the base station, whether to authenticate the wireless device for access to the satellite network based on the selected PRACH preamble or selected reserved service and provided unique identifiers.

25. The method of claim 1, further comprising:
maintaining, by a network server, a database of unique identifiers for wireless devices that are allowed for emergency services and for pre-authentication of the wireless devices.

26. The method of claim 25, wherein the wireless device has pre-provisioned authentication information which is used for pre-authentication of the wireless device.

27. The method of claim 1, wherein the message grant sent by the base station to the wireless device contains additional application data based on the selected reserved PRACH preamble.

28. The method of claim 1, further comprising
smoothing, by the base station, traffic from the wireless device to the base station based on network traffic conditions;
wherein smoothing traffic from the wireless device to the base station entails changing a periodicity of the physical random access channel (PRACH).

29. A satellite wireless network that provides management of a network demand for emergency services, comprising:
a base station configured to:
adaptively reserve PRACH (physical random access channel) preambles configuration for a plurality of reserved services;
broadcast the reserved PRACH preambles configuration a wireless device configured to:
receive the reserved PRACH preambles configuration;
selects a reserved service from the plurality of reserved services; and transmits a PRACH preamble from the reserved preambles;
wherein the base station is further configured to:
transmit a message grant to the wireless device in response to the PRACH preamble;
control access to emergency services of the plurality of reserved services based on at least one of an access point name (APN) of the wireless device, or a requested service type;
wherein the wireless device is further configured to:
transmit to the base station a response that includes the selected reserved service from the plurality of reserved services in response to the message grant from the base station.

30. A method for managing a network demand for emergency services, comprising:
receiving, by a wireless device, a reserved PRACH preambles configuration;
wherein a base station adaptively reserves the reserved PRACH (physical random access channel) preambles configuration for a plurality of reserved services;
wherein the base station broadcasts the reserved PRACH preambles configuration;
selecting, by the wireless device, a reserved service from the plurality of reserved services and transmitting, by the wireless device, a PRACH preamble from the reserved PRACH preambles configuration;
wherein the base station transmits a message grant to the wireless device in response to the PRACH preamble;

transmitting, by the wireless device, to the base station a response that includes the selected reserved service from the plurality of reserved services in response to the message grant from the base station;
wherein accessing to emergency services of the plurality of reserved services is controlled based on at least one of an access point name (APN) of the wireless device, or a requested service type.

\* \* \* \* \*